(12) United States Patent
Sheehan et al.

(10) Patent No.: US 8,171,118 B2
(45) Date of Patent: May 1, 2012

(54) APPLICATION STREAMING OVER HTTP

(75) Inventors: John Sheehan, Somerville, MA (US);
Naveed Ahmad, Medford, MA (US);
Kristofer Reierson, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/183,956

(22) Filed: Jul. 31, 2008

(65) Prior Publication Data

US 2009/0313322 A1      Dec. 17, 2009

Related U.S. Application Data

(60) Provisional application No. 61/061,406, filed on Jun. 13, 2008.

(51) Int. Cl.
*G06F 15/16* (2006.01)
(52) U.S. Cl. ......... 709/220; 709/224; 709/228; 370/253
(58) Field of Classification Search ................. 709/224, 709/227, 238, 220, 228; 370/253
See application file for complete search history.

(56) References Cited

U.S. PATENT DOCUMENTS

| | | | |
|---|---|---|---|
| 5,794,039 A * | 8/1998 | Guck | 1/1 |
| 6,807,550 B1 * | 10/2004 | Li et al. | 707/796 |
| 6,970,866 B1 * | 11/2005 | Pravetz et al. | 1/1 |
| 7,058,014 B2 | 6/2006 | Sim | |
| 7,099,939 B2 * | 8/2006 | von Klopp et al. | 709/224 |
| 7,412,492 B1 * | 8/2008 | Waldspurger | 709/216 |
| 7,463,268 B2 * | 12/2008 | Green | 345/541 |
| 7,644,414 B2 * | 1/2010 | Smith et al. | 719/328 |
| 7,664,048 B1 * | 2/2010 | Yung et al. | 370/253 |
| 2002/0156881 A1 * | 10/2002 | Klopp Lemon et al. | 709/224 |
| 2003/0236924 A1 | 12/2003 | Auffret | |
| 2004/0073596 A1 | 4/2004 | Kloninger | |
| 2005/0193139 A1 | 9/2005 | Vinson | |
| 2006/0174160 A1 | 8/2006 | Kim | |
| 2006/0212539 A1 | 9/2006 | Palevich | |
| 2007/0121585 A1 | 5/2007 | Morrissey | |
| 2007/0136374 A1 | 6/2007 | Guedalia | |

OTHER PUBLICATIONS

Kim et al., "On demand Software Streaming System for Embedded System," IEEE, 2006, pp. 1-4.
Kuacharoen et al., "Software Streaming via Block Streaming," http://ece.gatech.edu/research/codesign/publications, downloaded 2009, 6 pages.
Kuacharoen et al., "Stream-Enabled File I/O for Embedded Systems," http://codesign.ece.gatech.edu/publications, downloaded 2009, 14 pages.
Kuacharoen, "Embedded Software Streaming via Block Streaming," School of Electrical and Computing Engineering, Georgia Institute of Technology, Apr. 2004, 133 pages.
Bloor et al., "The Dynamic Management of Software Licenses," Sep. 2006, pp. 1-13.

\* cited by examiner

*Primary Examiner* — Khanh Dinh
(74) *Attorney, Agent, or Firm* — Woodcock Washburn LLP

(57) ABSTRACT

Disclosed are systems and methods for application streaming over HTTP. A virtual application running on a host computing device may detect the need for a page of memory that is not present on the host computing device. Accordingly, the virtual application may send a request to a virtual application server, seeking the absent memory page. The virtual application server may send to a web server an HTTP GET byte range request for the desired memory page. The web server may retrieve the requested block, which may be a portion of the virtual application image file. The requested data is returned to the host computing device via the virtual application server. The virtual application continues running on the host device using the requested data.

9 Claims, 3 Drawing Sheets

APPLICATION STREAMING OVER HTTP

CROSS-REFERENCE TO RELATED APPLICATIONS

This application claims benefit under 35 U.S.C. §119(e) of provisional U.S. patent application No. 61/061,406, filed Jun. 13, 2008, the disclosure of which is incorporated herein by reference.

BACKGROUND

When using the Internet, network latency and distance to server may be important. A request for data typically means a roundtrip to the server, which takes time and increases latency. Such latency tends to lead to poor user experience, especially when streaming an application, where the user may notice delays in loading executable data.

One way to reduce the latency is to move the data closer to the end user. Web sites are known to use a Content Delivery Network (CDN) to do this. In the current state of the art, however, an independent software vendor (ISV) desiring to stream an application over the internet typically cannot use a CDN because CDN's distribute only static data using a standard protocol like HTTP. Further, CDNs do not service custom services on their servers.

Accordingly, an ISV desiring to stream an application over the internet typically needs to deploy a custom set of servers, running a custom network protocol, and to manage them in a data center. This limits the ISV's ability to scale. For example, they might need to build a large number of datacenters in order to replicate what a CDN could provide if they could stream via HTTP.

SUMMARY

Disclosed herein are systems and methods for application streaming over HTTP. Such systems eliminate the need for a custom server, and send file I/O requests through the HTTP protocol.

HTTP streaming, as described herein, refers to using a standard web server to stream virtual applications, using HTTP as the protocol for transporting data over the network. The virtual application image file may be stored on a web server that is capable of communicating using HTTP. The virtual application image file may include one or more data files and one or more executable files. File I/O requests may be sent through HTTP. A virtual application client may have the ability to read ranges of the file to get the data it needs, so that it does not stream the entire contents of the file or any file contained in the virtual application.

Thus, from the perspective of the web server, the virtual application may be a single data file. Accordingly, the need for a custom server may be eliminated. This may provide for lower cost to deploy and manage a streaming solution. Additionally, by using a CDN, an ISV can put their data closer to the user, decreasing the time necessary to load and launch applications.

The systems and methods described herein provide for on-demand delivery of any file type that a virtual application can use, even executable code. Such an approach allows for the delivery of only the portion of the file that is desired. For example, in the case of an executable, only the portion of the executable code necessary to run the application may be delivered. Thus, the application may respond much more quickly than if the entire file were to be read.

Additionally, by using standard HTTP verbs (e.g., GET, PUT, etc.) and treating the data like a file, the systems and methods described herein provide a mechanism for integration into a CDN without the need to provision a custom server.

DETAILED DESCRIPTION OF ILLUSTRATIVE EMBODIMENTS

Figure 1:
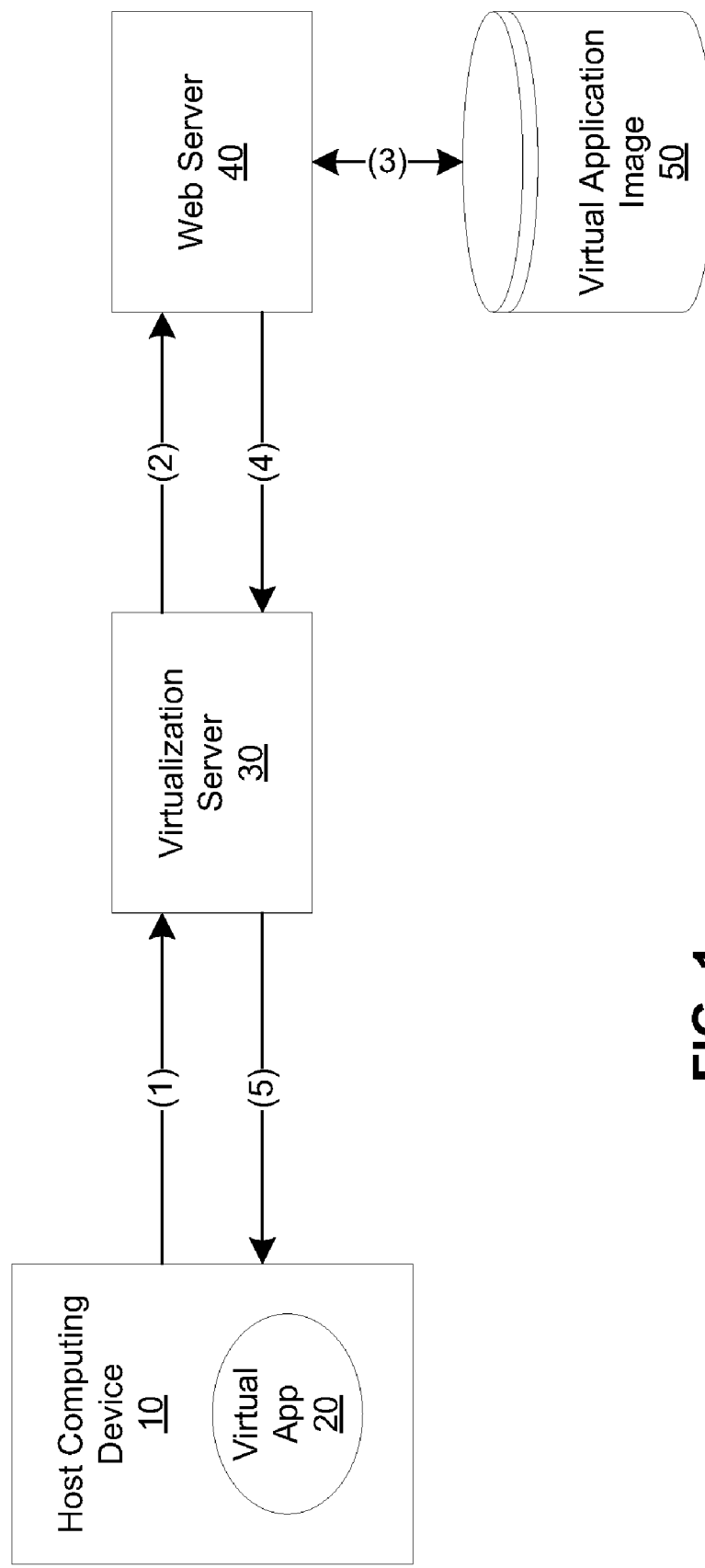
FIG. 1 is a functional block diagram of an example system and method for application streaming over HTTP.

FIG. 1 is a functional block diagram of an example system and method for application streaming over HTTP. As shown, a host, or "client," computing device 10 may communicate with a web server 40 via a network, such as the Internet, for example. The host computing device 10 may be, for example, a desktop, laptop, or handheld computing system, as described in detail below. An example of a web server 40 may be Microsoft's Internet Information Server ("IIS").

Often, only a percentage of a file is necessary for a virtual application to perform. It is, therefore, inefficient to download the entire file. If the application virtualization solution (like VMware's Thinstall, for example) needs to read the entire file from the server before the user can access it, the user will have a poor experience. By downloading only a percentage of the entire file, the user can interact with the application in only a fraction of the time. For example, suppose only 5 MB of a 50 MB file is needed. Presumably, the user could begin to interact with the application in about 1/10 of the time, after a 5 MB download versus a 50 MB download.

As described herein, a byte range request in the HTTP protocol may be used to allow the application virtualization (AppVirt) client to retrieve only that portion of the file that is needed at that time, allowing the user to use the application much sooner than if the entire file needed to be downloaded. This can be done for any type of file, e.g., a data file or executable file.

As shown in FIG. 1 at step 1, a virtual application 20 running on the host computing device 10 may detect the need for a page of memory that is not present on the host computing device 10. Accordingly, the virtual application 20 may send a request to a virtual application server 30, seeking the absent memory page. An example virtual application server system is Microsoft's SoftGrid.

At step 2, the virtual application server 30 may send an HTTP GET byte range request for the desired memory page. A byte range request enables reading only a portion of a file. Because all HTTP entities are represented in HTTP messages as sequences of bytes, the concept of a byte range is meaningful for any HTTP entity. Byte range specifications in HTTP apply to the sequence of bytes in the entity-body (which is not necessarily the same as the message-body).

A byte range operation may specify a single range of bytes, or a set of ranges within a single entity, e.g., ranges-specifier=byte-ranges-specifier
byte-ranges-specifier=bytes-unit "=" byte-range-set
byte-range-set=1#(byte-range-spec|suffix-byte-range-spec)
byte-range-spec=first-byte-pos "-" [last-byte-pos]
first-byte-pos=1*DIGIT last-byte-pos=1*DIGIT.

The first-byte-pos value in a byte-range-spec gives the byte-offset of the first byte in a range. The last-byte-pos value gives the byte-offset of the last byte in the range; that is, the byte positions specified are inclusive. Byte offsets start at zero.

If the last-byte-pos value is present, it must be greater than or equal to the first-byte-pos in that byte-range-spec, or the byte-range-spec is syntactically invalid. The recipient of a byte-range-set that includes one or more syntactically invalid byte-range-spec values must ignore the header field that includes that byte-range-set. If the last-byte-pos value is absent, or if the value is greater than or equal to the current length of the entity-body, last-byte-pos is taken to be equal to one less than the current length of the entity-body in bytes. By its choice of last-byte-pos, a client can limit the number of bytes retrieved without knowing the size of the entity.

A suffix-byte-range-spec is used to specify the suffix of the entity-body, of a length given by the suffix-length value, e.g., suffix-byte-range-spec="-" suffix-length
suffix-length=1*DIGIT.

That is, this form specifies the last N bytes of an entity-body. If the entity is shorter than the specified suffix-length, the entire entity-body is used.

If a syntactically valid byte-range-set includes at least one byte-range-spec whose first-byte-pos is less than the current length of the entity-body, or at least one suffix-byte-range-spec with a non-zero suffix-length, then the byte-range-set is satisfiable. Otherwise, the byte-range-set is unsatisfiable. If the byte-range-set is unsatisfiable, the server should return a response with a status indicating that the requested range is not satisfiable. Otherwise, the server should return a response with a status containing the satisfiable ranges of the entity-body.

The following are examples of byte-ranges-specifier values (assuming an entity-body of length 10000):

the first 500 bytes (byte offsets 0-499, inclusive): bytes=0-499;

the second 500 bytes (byte offsets 500-999, inclusive): bytes=500-999;

the final 500 bytes (byte offsets 9500-9999, inclusive): bytes=-500;

the final 500 bytes (byte offsets 9500-9999, inclusive): bytes=9500-;

the first and last bytes only (bytes 0 and 9999): bytes=0-0,-1.

The following are legal, but non-canonical specifications of the second 500 bytes (byte offsets 500-999, inclusive):

bytes=500-600,601-999;
bytes=500-700,601-999.

HTTP range retrieval requests using conditional or unconditional GET methods may request one or more sub-ranges of the entity, instead of the entire entity, using the Range request header, which applies to the entity returned as the result of the request, e.g., Range="Range" ":" ranges-specifier.

A server may ignore the Range header. However, HTTP/1.1 origin servers and intermediate caches should support byte ranges when possible, since Range supports efficient recovery from partially failed transfers, and supports efficient partial retrieval of large entities.

If the server supports the Range header and the specified range or ranges are appropriate for the entity, then, the presence of a Range header in an unconditional GET modifies what is returned if the GET is otherwise successful. In other words, the response carries a status code of 206 (Partial Content) instead of 200 (OK). The presence of a Range header in a conditional GET (a request using one or both of If-Modified-Since and If-None-Match, or one or both of If-Unmodified-Since and If-Match) modifies what is returned if the GET is otherwise successful and the condition is true. It does not affect the 304 (Not Modified) response returned if the conditional is false. In some cases, it might be more appropriate to use an If-Range header in addition to the Range header.

If a proxy that supports ranges receives a Range request, forwards the request to an inbound server, and receives an entire entity in reply, it should return only the requested range to its client. Further, it should store the entire received response in its cache, if that is consistent with its cache allocation policies.

With reference again to FIG. 1, at step 3, the web server 40 gets the requested block, which is a portion of the virtual application image file. The virtual application image file, which may be stored in a memory 50 accessible by the web server 40, may include any number or types of files, including data and executable files.

At step 4, the requested data is returned to the client 10 via the virtual application server 30. At step 5, the application 20 continues running on the host computing device 10 using the requested data.

As an example, suppose the virtual application 20 resides in an image file 50 called VirtualApp.sft, and this application has two files, say, virtapp.exe, which is 10 MB, and support.dll, which is 50 MB. Suppose further that, as the virtual application 20 runs on the host computing device 10, it needs to access function 'DoSomething,' which resides at offset 1000 in the .sft file. The following HTTP GET may be sent from the virtualization server 30 to the web server 40:

GET/virtualApp.sft HTTP/1.1
Range: bytes 1000-4096.

In response to receiving the HTTP byte range request, the web server 40 will return only the potion requested by the application 20, and not the entire file. This is much more efficient than existing solutions, which would require the use of a custom server (as existing solutions require proprietary protocols), and downloading of the entire file.

Example Computing Environment

Figure 2:
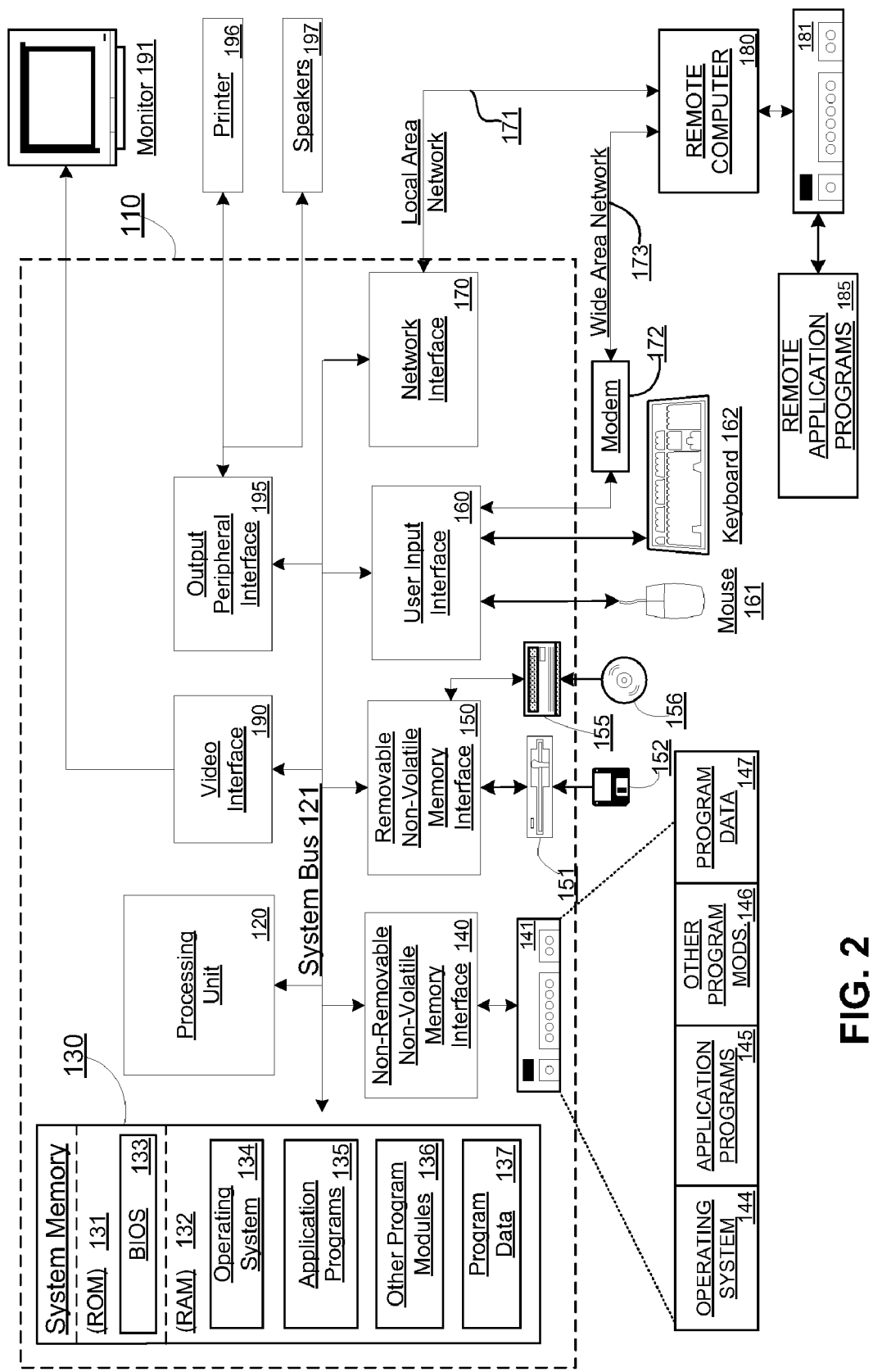
FIG. 2 is a block diagram of an example computing environment in which example embodiments and aspects of the present invention may be implemented.

FIG. 2 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 2, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Network Environment

Figure 3:
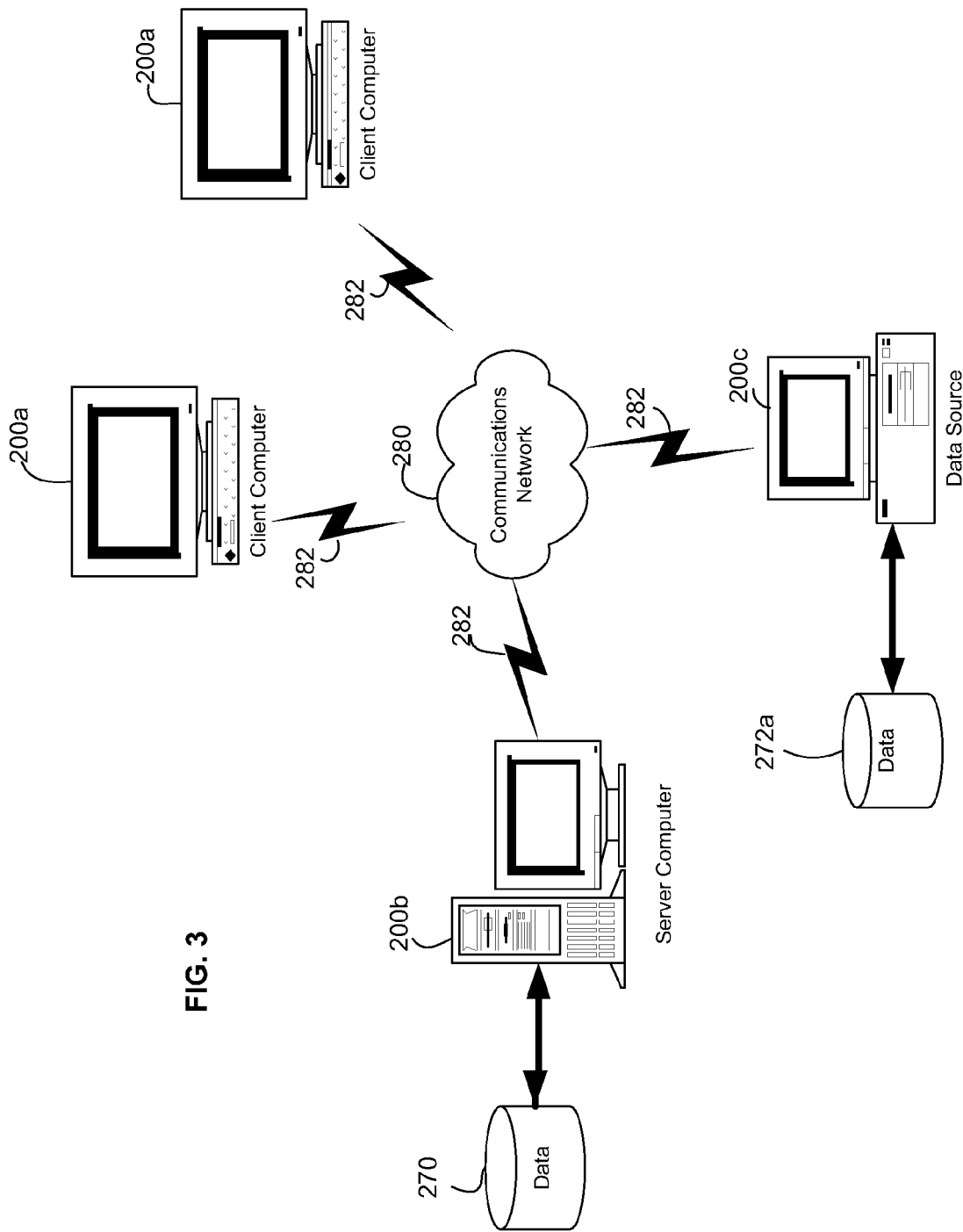
FIG. 3 is an example network configuration in which aspects of the invention may be implemented.

FIG. 3 illustrates an example network environment in which the present invention may be employed. Of course, actual network and database environments may be arranged in a variety of configurations; however, the example environment shown here provides a framework for understanding the type of environment in which an embodiment may operate.

The example network may include one or more client computers 200a, a server computer 200b, data source computers 200c, and/or databases 270, 272a, and 272b. The client computers 200a and the data source computers 200c may be in electronic communication with the server computer 200b by way of the communications network 280 (e.g., an intranet, the Internet or the like). The client computers 200a and data source computers 200c may be connected to the communications network by way of communications interfaces 282. The communications interfaces 282 can be any type of communications interfaces such as Ethernet connections, modem connections, wireless connections and so on.

The server computer 200b may provide management of the database 270 by way of database server system software such as MICROSOFT®'s SQL SERVER or the like. As such, server 200b may act as a storehouse of data from a variety of data sources and provides that data to a variety of data consumers.

In the example network environment of FIG. 3, a data source may be provided by data source computer 200c. Data source computer 200c may communicate data to server computer 200b via communications network 280, which may be a LAN, WAN, Intranet, Internet, or the like. Data source computer 200c may store data locally in database 272a, which may be database server or the like. The data provided by data source 200c can be combined and stored in a large database such as a data warehouse maintained by server 200b.

Client computers 200a that desire to use the data stored by server computer 200b can access the database 270 via communications network 280. Client computers 200a access the data by way of, for example, a query, a form, etc. It will be appreciated that any configuration of computers is equally compatible with an embodiment of the present invention.

What is claimed:

1. A method for application streaming, the method comprising:
    receiving a message from a host computing device, the message being indicative of a request for an identified portion of a virtual application image file, the virtual application image file corresponding to a virtual application running on the host computing device, the identified portion of the virtual application image file corresponding to a memory page that is absent on the host computing device;
    determining from the message a byte range that corresponds to a location on a remote server of the identified portion of the virtual application image file;
    sending to the remote server a request identifying the byte range; and
    providing the identified portion of the virtual application file to the host computing device, wherein the portion is less than a complete virtual application image file.

2. The method of claim 1, wherein the remote sever is a web server, and no proprietary protocol is necessary to request the identified portion of the virtual application image file from the web server.

3. A non-transitory computer-readable storage medium, bearing computer-readable instructions that, upon execution by a computer, cause the computer to perform operations comprising:
    receiving a message from a host computing device, the message being indicative of a request for an identified a portion of a virtual application image file, the virtual application image file corresponding to a virtual application running on the host computing device, the identified portion of the virtual application image file corresponding to a memory page that is absent on the host computing device;
    sending to a remote server a request comprising a byte range corresponding to only the identified portion of the virtual application image file; and
    providing only the identified portion of the virtual application image file to the host computing device.

4. The computer-readable storage medium of claim 3, wherein the remote sever is a web server.

5. The computer-readable storage medium of claim 4, wherein no proprietary protocol is necessary to request the identified portion of the virtual application image file from the web server.

6. A system, comprising:
    a processor; and a memory communicatively coupled to the processor when the system is operational, the memory bearing instructions that, upon execution by the processor, cause the system to at least:
    receive a request from a host computing device, the request being indicative of a request for an identified a portion of a virtual application image file, the virtual application image file corresponding to a virtual application running on the host computing device, the identified portion of the virtual application image file corresponding to a memory page that is absent on the host computing device;
    determine from the request a byte range that corresponds to a location on a remote server of the identified portion of the virtual application image file;
    send to the remote server a request identifying the byte range; and
    provide only the requested portion of the virtual application image file to the host computing device.

7. The system of claim 6, wherein the remote sever is a web server, and no proprietary protocol is necessary to request the requested portion of the virtual application image file from the web server.

8. The system of claim 7, wherein the remote sever is a web server.

9. The system of claim 7, wherein no proprietary protocol is necessary to request the identified portion of the virtual application image file from the web server.

* * * * *

UNITED STATES PATENT AND TRADEMARK OFFICE
CERTIFICATE OF CORRECTION

| | | |
|---|---|---|
| PATENT NO. | : 8,171,118 B2 | Page 1 of 1 |
| APPLICATION NO. | : 12/183956 | |
| DATED | : May 1, 2012 | |
| INVENTOR(S) | : John Sheehan et al. | |

It is certified that error appears in the above-identified patent and that said Letters Patent is hereby corrected as shown below:

In column 8, line 15, in Claim 3, after "identified" delete "a".

In column 8, line 39, in Claim 6, after "identified" delete "a".

Signed and Sealed this
Third Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,171,118 B2 | |
| APPLICATION NO. | : 12/183956 | |
| DATED | : May 1, 2012 | |
| INVENTOR(S) | : John Sheehan et al. | |

It is certified that error appears in the above-identified patent and that said Letters Patent is hereby corrected as shown below:

In Column 8, line 10, delete "non-transitory computer-readable storage medium" and insert --computer-readable storage-medium, excluding signals--, therefor.

Signed and Sealed this
Eighteenth Day of December, 2012

David J. Kappos
*Director of the United States Patent and Trademark Office*